Patented Apr. 18, 1950

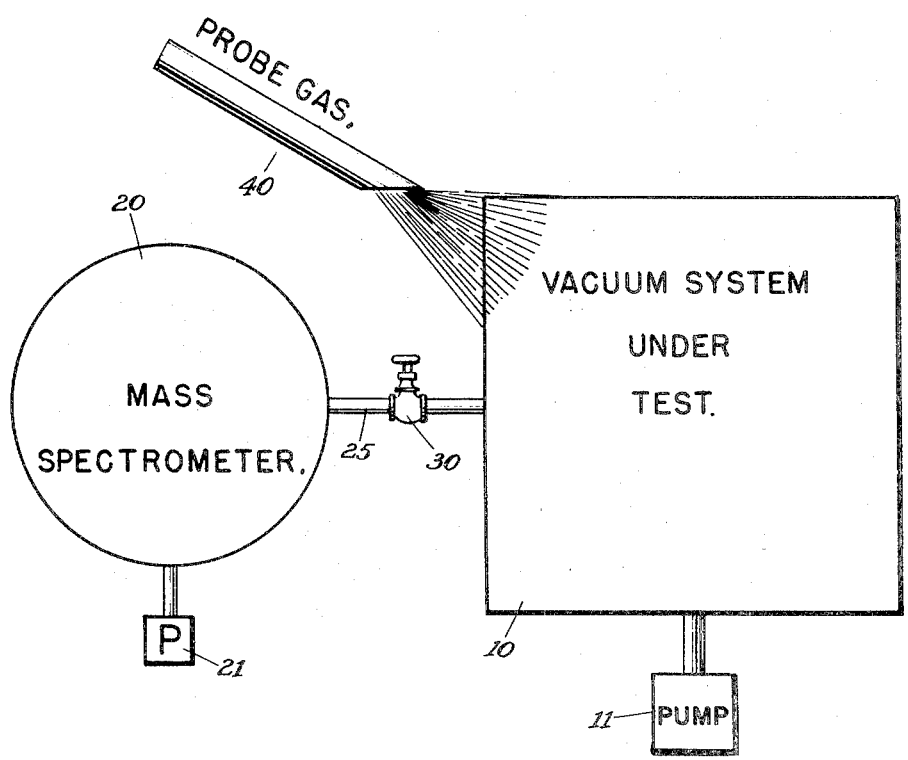

2,504,530

UNITED STATES PATENT OFFICE 2,504,530

VACUUM LEAK DETECTOR METHOD

Robert B. Jacobs, Rochester, N. Y., assignor, by mesne assignments, to the United States of America as represented by the Atomic Energy Commission Application June 12, 1946, Serial No. 676,163

2 Claims. (Cl. 73—40)

This invention relates to a method and apparatus for detecting the presence of a leak in a vacuum system.

It is the principal object of this invention to enable a mass spectrometer to be used for a secondary function to indicate the presence of a leak in a vacuum system to which the mass spectrometer is already connected. To this end, a probe gas is directed against the exterior of the vacuum system and the method and apparatus for connecting the mass spectrometer to the vacuum system is so arranged that any reasonable size or number of vacuum systems may be tested without contaminating the spectrometer system or reducing the sensitivity of the mass spectrometer to respond to the presence of the probe gas.

The mass spectrometer is a well known instrument and is widely used to indicate the presence of a gas in a partial vacuum or to indicate the presence of a selected gas in a mixture of gases in a partially evacuated system. The instrument has been disclosed in "The Review of Scientific Instruments," July 1940, volume II, pages 212 to 216, inclusive. Broadly, the instrument, the details of which form no part of this invention, may be described as a vacuum tube or vacuum system which is continuously evacuated to a predetermined degree and has means for introducing through a capillary leak a small amount of gaseous mixture to be analyzed. The introduced gas is ionized by bombardment with electrons contained in an electron stream produced within the spectrometer tube. The positive ions of the various gases in the introduced gaseous mixture are accelerated by suitable accelerating electrodes towards a collecting plate and into a magnetic field, the lines of force of which are at right angles to the direction of travel of the ions. In accordance with well known physical principles, the heavier mass ions will be deflected to a greater extent by the magnetic field than the lighter mass ions and by suitable adjusting the accelerating voltages and the electric current producing the magnetic field, the positive ions of a given mass weight may be collected at the collecting electrode and indicated by the flow of electron current necessary to neutralize the positive ions. When the accelerating voltages and the magnetic field current are properly calibrated the presence of any gaseous element which may be ionized can be determined.

Since the mass spectrometer is itself a vacuum system, it may be used to detect leaks in its own vacuum system. A known probe gas such as helium may be directed against the exterior of the spectrometer and by adjusting the mass spectrometer to respond to the presence of the helium gas, a leak in the system may be detected when the presence of the helium gas within the spectrometer is indicated. However, the sensitivity of the mass spectrometer is maintained only within a critical range of the degree of vacuum for the spectrometer system and should a leak to be detected be too large with relation to the pumping speed of the pumping system which maintains the vacuum in the mass spectrometer, the instrument will not function properly to detect the presence of the probe gas. This is a condition likely to be encountered when using the mass spectrometer to detect the presence of leaks in another or larger vacuum system which in turn may be maintained at a different degree of vacuum than the critical degree of vacuum for the most effective operation of the mass spectrometer system.

It is therefor an important object of this invention to provide a method and apparatus for enabling a mass spectrometer to be effectively used to indicate the presence of a leak in a large vacuum system which may be maintained at different degree of vacuum from the degree of vacuum in the mass spectrometer. The method and apparatus includes a controllable valve in the connection between the vacuum system to be tested and the vacuum system of the mass spectrometer which systems are separately and continuously evacuated. The use of the method and apparatus of this invention also enables the mass spectrometer to indicate the existence of a small leak in the vacuum system to be tested in the presence of a larger leak in the system.

Further object and advantages will be apparent by reference to the following specification and drawing in which the single figure is a diagrammatic illustration of the vacuum testing apparatus.

Referring to the drawing, a vacuum system 10 to be tested is connected to a mass spectrometer 20 by the conduit 25 containing an adjustable flow proportioning valve 30. A pump 11 is provided to continuously evacuate the system to be tested and the pump may be adjusted in any known manner to maintain a desired degree of vacuum in the system 10 regardless of the number or size of leaks to be indicated. Similarly, the mass spectrometer system is maintained at the degree of evacuation necessary for its most effective operation by continuous actuation of the pump 21.

With the systems connected as shown and evacuated by the pumps as described, a leak in the vacuum system 10 may be indicated by directing a stream of probe gas of known composition (for example, helium) from the probe 40 against various parts of the exterior of the system 10. The mass spectrometer 20 is adjusted to indicate the presence within its system of the selected probe gas (helium). If there is a leak in the vacuum system 10, and the probe gas is directed at the leak, an appreciable amount or sample of the probe gas will be received within the mass spectrometer system and will be detected so that the location of the leak can be determined. The amount of probe gas entering the mass spectrometer 20 and the adjusted position of the valve 30 will be an indication of the size of the leak encountered. Obviously, by suitably adjusting the valve, any size leak in a vacuum system or plurality of systems maintained at any reasonable degree of vacuum can be detected without interfering with the required degree of vacuum in the mass spectrometer necessary for its most effective operation. Since the mass spectrometer is maintained at its most sensitive condition the location of a small leak in the system under test may be indicated in the presence of a larger leak elsewhere in the system under test.

The use of the valve 30 in the connection 25 is also of advantage since it permits the connection and disconnection of many vacuum systems with respect to the mass spectrometer without altering the vacuum in the mass spectrometer vacuum system. By properly adjusting the valve 30 and the pumps 11 and 21 the gaseous flow through the connection 25 may be suitably proportioned to maintain optimum operating conditions for the mass spectrometer and a required sample of the gaseous composition in the system under test may be supplied to the mass spectrometer regardless of the size or condition of the vacuum system to be tested.

It should be understood that any mechanical type of valve may be used and that any composition of probe gas may be selected so long as the mass spectrometer is adjusted to respond to the presence of the selected probe gas in its system.

As an example of the performance of the method and apparatus of this invention, consider the following. A vacuum system 10 having two leaks, one of which is two hundred times as large as the other may be tested. The degree of vacuum in this system is maintained at a few hundred microns by constantly operating the pump 11. The mass spectrometer 20 is connected to this system through the valve 30 and the degree of evacuation within the mass spectrometer is maintained at optimum by suitably adjusting the valve 30. With this arrangement it is possible to detect the smaller leak simply by passing over it with a small jet of probe gas issuing from the probe 40.

I claim:

1. The method of determining the presence of a leak in a vacuum system which comprises the steps of connecting the evacuated chamber of a mass spectrometer to the evacuated portions of the vacuum system under test which is separately evacuated, continuously exhausting the combined vacuum systems, controlling the flow of gas through the connection between the mass spectrometer and the system under test to properly proportion the evacuated conditions in the mass spectrometer and the system under test, directing a stream of probe gas against the exterior surfaces of the system under test, and determining the presence of a leak in the vacuum system under test by the indication of the presence of the probe gas in the mass spectrometer.

2. The method of determining the presence of a leak in a vacuum system which comprises the steps of connecting the evacuated chamber of a mass spectrometer to the evacuated portions of the vacuum system under test which is separately evacuated, continuously exhausting the combined vacuum systems, controlling the flow of gas through the connection between the mass spectrometer and the system under test to properly proportion the evacuated conditions in the mass spectrometer and the system under test, directing a stream of probe gas against the exterior surfaces of the system under test, adjusting the mass spectrometer to respond to and indicate the presence of the selected probe gas in the mass spectrometer, and determining the presence of a leak in the vacuum system under test by the indication of the presence of the probe gas in the mass spectrometer.

ROBERT B. JACOBS.

REFERENCES CITED

The following references are of record in the file of this patent:

UNITED STATES PATENTS

| Number | Name | Date |
| --- | --- | --- |
| 2,255,921 | Fear | Sept. 16, 1941 |
| 2,387,786 | Washburn | Oct. 30, 1945 |